(12) United States Patent
Horvath et al.

(10) Patent No.: US 12,110,979 B1
(45) Date of Patent: Oct. 8, 2024

(54) PRESSURE ENERGIZED GATE VALVE SEAT AND SEAL ASSEMBLY

(71) Applicant: ZP INTERESTS, LLC, Spring, TX (US)

(72) Inventors: Balazs Horvath, Spring, TX (US); Charles W. Bedford, Houston, TX (US)

(73) Assignee: ZP INTERESTS, LLC, Spring, TX (US)

( * ) Notice: Subject to any disclaimer, the term of this patent is extended or adjusted under 35 U.S.C. 154(b) by 0 days.

(21) Appl. No.: 18/215,450

(22) Filed: Jun. 28, 2023

Related U.S. Application Data

(60) Provisional application No. 63/356,032, filed on Jun. 28, 2022.

(51) Int. Cl.
*F16K 3/20* (2006.01)
*F16K 3/02* (2006.01)

(52) U.S. Cl.
CPC ............ *F16K 3/207* (2013.01); *F16K 3/0227* (2013.01); *F16K 3/0236* (2013.01)

(58) Field of Classification Search
CPC ...... F16K 3/0236; F16K 3/0227; F16K 3/207; F16K 3/20
See application file for complete search history.

(56) References Cited

U.S. PATENT DOCUMENTS

| | | | | |
|---|---|---|---|---|
| 3,871,616 A | * | 3/1975 | Taylor | F16K 27/044 251/327 |
| 4,577,834 A | * | 3/1986 | Oliver | F16K 3/0236 251/327 |
| 4,592,558 A | * | 6/1986 | Hopkins | F16J 15/3212 277/572 |
| 4,643,395 A | * | 2/1987 | Williams, Jr. | F16K 3/0236 251/327 |
| 4,706,970 A | * | 11/1987 | Ramirez | F16J 15/3212 277/556 |
| 4,741,509 A | * | 5/1988 | Bunch | F16K 3/0236 251/327 |
| 4,824,074 A | * | 4/1989 | Baugh | F16K 39/04 251/328 |
| 4,878,651 A | * | 11/1989 | Meyer, Jr. | F16K 3/0236 251/328 |

(Continued)

*Primary Examiner* — David Colon-Morales
(74) *Attorney, Agent, or Firm* — Shackelford, McKinley & Norton, LLP; David L. Odom

(57) ABSTRACT

A gate valve body having a gate cavity intersecting a channel having a proximal channel portion and a distal channel portion on opposing sides of the gate cavity, a gate positioned in the gate cavity and moveable between closed and open positions, the gate having a proximal gate face and a distal gate face extending perpendicular to the channel; a proximal seat between a proximal valve body portion and the gate, the proximal seat having a first proximal seat face adjacent a proximal valve body face and a second proximal seat face adjacent the proximal gate face; a proximal annular groove on a radial outer surface of the proximal seat; a proximal axial seal positioned in the proximal annular groove in contact with the proximal seat and the valve body; and a proximal conduit extending through the proximal seat between the proximal channel portion and the proximal annular groove.

8 Claims, 8 Drawing Sheets

(56) References Cited

U.S. PATENT DOCUMENTS

| | | | | |
|---|---|---|---|---|
| 5,090,661 | A * | 2/1992 | Parks, Jr. | F16K 3/0227 251/174 |
| 5,192,051 | A * | 3/1993 | Roberson | F16K 3/0236 251/328 |
| 5,415,378 | A * | 5/1995 | Craven | E21B 34/02 251/329 |
| 5,624,101 | A * | 4/1997 | Beson | F16K 3/20 251/174 |
| 6,279,875 | B1 * | 8/2001 | Chatufale | F16K 3/207 251/328 |
| 6,454,015 | B1 * | 9/2002 | Armstrong | F16K 3/0263 166/85.4 |
| 6,966,537 | B2 * | 11/2005 | Sundararajan | F16K 3/0227 251/175 |
| 7,004,452 | B2 * | 2/2006 | Chatufale | F16K 3/0227 251/329 |
| 7,562,859 | B2 * | 7/2009 | Lam | F16K 3/0227 251/327 |
| 8,327,866 | B2 * | 12/2012 | Parks, Jr. | F16K 3/0236 251/328 |
| 8,662,473 | B2 * | 3/2014 | Comeaux | F16K 3/0227 251/328 |
| 8,672,295 | B2 * | 3/2014 | Dhawan | F16K 3/20 251/328 |
| 9,091,351 | B2 * | 7/2015 | DeOcampo | F16K 37/0041 |
| 9,206,910 | B2 * | 12/2015 | Kahn | F16K 25/005 |
| 9,453,578 | B2 * | 9/2016 | Sundararajan | F16K 3/0236 |
| 9,850,740 | B2 * | 12/2017 | Atencio | F16K 3/207 |
| 9,885,420 | B2 * | 2/2018 | Sundararajan | F16K 3/0227 |
| 10,072,763 | B2 * | 9/2018 | Chen | F16K 3/0236 |
| 10,378,659 | B2 * | 8/2019 | Scott | F16K 3/0236 |
| 10,683,941 | B2 * | 6/2020 | Lah | E21B 34/00 |
| 10,794,496 | B2 * | 10/2020 | Manson | F16K 5/205 |
| 10,995,863 | B2 * | 5/2021 | Ungchusri | F16K 3/0236 |
| 11,047,485 | B2 * | 6/2021 | Al-Jarallah | F16K 3/0254 |
| 11,174,958 | B2 * | 11/2021 | Moseley | F16K 3/16 |
| 11,199,270 | B1 * | 12/2021 | Valera | F16K 3/207 |
| 11,435,001 | B2 * | 9/2022 | Kalimuthu | F16K 27/044 |
| 11,448,324 | B2 * | 9/2022 | McEvoy | F16K 3/209 |
| 11,572,956 | B2 * | 2/2023 | McGuire | F16K 5/181 |
| 11,725,738 | B2 * | 8/2023 | Mullins | F16K 3/20 251/172 |
| 11,767,918 | B2 * | 9/2023 | Koricanek | F16K 3/0227 251/328 |
| 2010/0052267 | A1 * | 3/2010 | Castleman | F16J 15/166 277/553 |
| 2012/0080634 | A1 * | 4/2012 | Fenton | F16K 3/0236 251/328 |
| 2012/0318528 | A1 * | 12/2012 | Wolfe | F16K 3/0263 251/328 |

* cited by examiner

PRESSURE ENERGIZED GATE VALVE SEAT AND SEAL ASSEMBLY

CROSS-REFERENCE TO RELATED APPLICATIONS

This application claims the benefit of U.S. Provisional Application No. 63/356,032 filed Jun. 28, 2022, which is incorporated by reference herein in its entirety for any purpose. This application incorporates by reference U.S. Pat. No. 9,091,351.

BACKGROUND OF THE INVENTION

1. Field of the Invention

The present application relates generally to gate valve seals and more particularly, but not by way of limitation, to a pressure energized gate valve seat and seal assembly.

2. History of the Related Art

Industrial piping relies upon many types of valves, but by far the most prevalent are gate valves, which are used in applications where it is desired to prevent or allow flow of fluid through piping. Gate valves are particularly useful when minimal flow restriction is desired. Gate valves operate by having a planar member, the gate, which moves in a cavity within the valve. The gate can be translated within the gate valve so that an opening in the gate is in alignment with the flow passageway of the gate valve, an open position in which the gate valve allows fluid to flow through it from one side to the other. However, if the gate is translated to a position so that the opening within the gate is sufficiently out of alignment and unregistered with the flow passageway, a closed position, the flow through the gate is blocked such that fluid does not pass from one side of the gate valve to the other.

Often gate valves carry fluids that contain suspended solids. These fine solid particles can clog the gate passageway. In typical gate valves, solid particles in slurries that pass though the valve passageway tend to escape from the flow passageway into the gate cavity where they can concentrate. In the cavities, these solids can pack and, in some cases, solidify. These solid particles can compress in the ends of the gate passageway such that the amount of particulate matter at the ends prevents the gate from travelling freely in the gate passageway from a completely open to a completely closed position. When this happens, the gate valve may either provide excessive restriction of fluid flow in the open position on be unable to prevent flow in the closed position.

In the oil and gas industry, especially during the fracking operation, equipment greasing is critical and time intensive. When fracking the valves are exposed to the corrosive elements of fluids and solids (water, acids, sand, lubricants, etc.). With traditional valves and valve seal arrangements the contaminants need to be flushed and replaced with new lubricant in between frac stages. A single fracking operation can be over hundred stages and require greasing multiple valves between each stage requiring significant operating time and costs.

SUMMARY

An exemplary gate valve includes a valve body having a gate cavity intersecting a channel having a proximal channel portion and a distal channel portion on opposing sides of the gate cavity, wherein a three-dimensional frame of reference comprises three mutually orthogonal directions, wherein an X axis corresponds to a center axis of the channel, a Y axis is a center line of the gate cavity, and a Z axis orthogonal to the X axis and the Y axis; a gate positioned in the gate cavity and moveable between a closed position blocking flow through the channel and an open position allowing flow through the channel, the gate having a proximal gate face and a distal gate face extending perpendicular to the channel; a proximal seat between a proximal valve body portion and the gate, the proximal seat having a first proximal seat face adjacent a proximal valve body face and a second proximal seat face adjacent the proximal gate face; a proximal annular groove on a radial outer surface of the proximal seat; a proximal axial seal positioned in the proximal annular groove in direct contact with the proximal seat and the valve body; a proximal conduit extending through the proximal seat between the proximal channel portion and the proximal annular groove; a distal seat between a distal valve body portion and the gate, the distal seat having a first distal seat face adjacent a distal valve body face and a second distal seat face adjacent the distal gate face; a distal annular groove on a radial outer surface of the distal seat; a distal axial seal positioned in the distal annular groove in direct contact with the distal seat and the valve body; and a distal conduit extending through the distal seat between the distal channel portion and the distal annular groove.

This summary is provided to introduce a selection of concepts that are further described below in the detailed description. This summary is not intended to identify key or essential features of the claimed subject matter, nor is it intended to be used as an aid in limiting the scope of claimed subject matter.

BRIEF DESCRIPTION OF THE DRAWINGS

The disclosure is best understood from the following detailed description when read with the accompanying figures. It is emphasized that, in accordance with standard practice in the industry, various features are not drawn to scale. In fact, the dimensions of various features may be arbitrarily increased or reduced for clarity of discussion. As will be understood by those skilled in the art with the benefit of this disclosure, elements and arrangements of the various figures can be used together and in configurations not specifically illustrated without departing from the scope of this disclosure.

DETAILED DESCRIPTION

Figure 1:
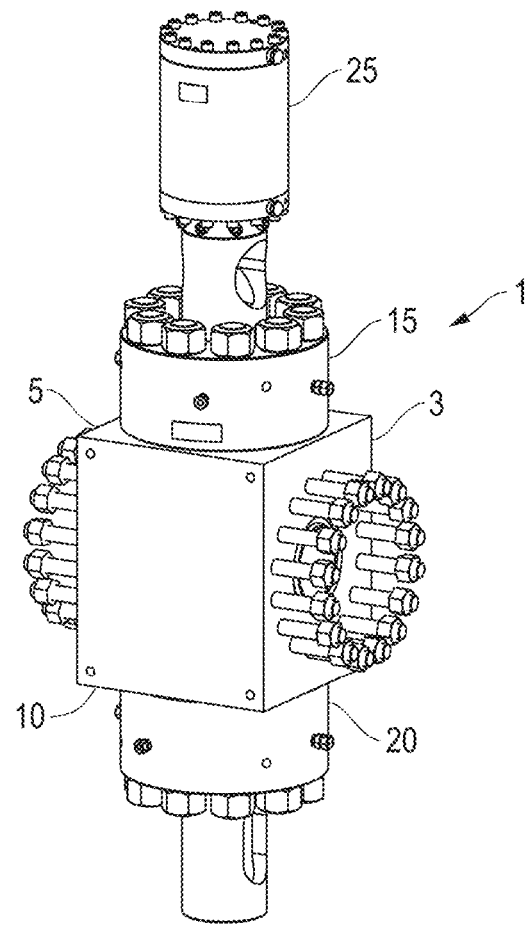
FIG. 1 is a perspective view of an exemplary gate valve according to one or more aspects of the disclosure.

In the following description, numerous specific details are set forth to provide a thorough understanding of the present invention. However, it will be apparent to those skilled in the art that the present disclosure may be practiced without such specific details. It is to be understood that both the foregoing general summary description and the following detailed description are illustrative and explanatory, and are not restrictive of the subject matter, as claimed. It is to be further understood that the following disclosure also provides many different embodiments, or examples, for implementing different features of various illustrative embodiments. Specific examples of components and arrangements are described below to simplify the disclosure. These are, of course, merely examples and are not intended to be limiting. For example, a figure may illustrate an exemplary embodiment with multiple features or combinations of features that are not required in one or more other embodiments and thus a figure may disclose one or more embodiments that have fewer features or a different combination of features than the illustrated embodiment. Embodiments may include some but not all the features illustrated in a figure and some embodiments may combine features illustrated in one figure with features illustrated in another figure. Therefore, combinations of features disclosed in the following detailed description may not be necessary to practice the teachings in the broadest sense and are instead merely to describe particularly representative examples. In addition, the disclosure may repeat reference numerals and/or letters in the various examples. This repetition is for the purpose of simplicity and clarity and does not itself dictate a relationship between the various embodiments and/or configurations discussed.

In this application, the use of the singular includes the plural, the word "a" or "an" means "at least one", and the use of "or" means "and/or", unless specifically stated otherwise. Furthermore, the use of the term "including", as well as other forms, such as "includes" and "included", is not limiting. Also, terms such as "element" or "component" encompass both elements or components comprising one unit and elements or components that comprise more than one unit unless specifically stated otherwise. In addition, the use of terms such as "above," "below," "upper," "lower," or other like terms to describe a spatial relationship between various components or to describe the spatial orientation of aspects of such components should be understood to describe a relative relationship between the components or a spatial orientation of aspects of such components, respectively, as the device described herein may be oriented in any desired direction.

In the specification, reference may be made to the spatial relationships between various components and to the spatial orientation of various aspects of components as the devices are depicted in the attached drawings. However, as will be recognized by those skilled in the art after a complete reading of the present application, the devices, members, apparatuses, etc. described herein may be positioned in any desired orientation. Thus, the use of terms such as "inboard," "outboard," "above," "below," "upper," "lower," or other like terms to describe a spatial relationship between various components or to describe the spatial orientation of aspects of such components should be understood to describe a relative relationship between the components or a spatial orientation of aspects of such components, respectively, as the device described herein may be oriented in any desired direction.

As used herein, the terms "connect," "connection," "connected," "in connection with," and "connecting" may be used to mean in direct connection with or in connection with via one or more elements. Similarly, the terms "couple," "coupling," and "coupled" may be used to mean directly coupled or coupled via one or more elements. Conditional language used herein, such as, among others, "can," "might," "may," "e.g.," and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include such elements or features.

The term "substantially," "approximately," and "about" is defined as largely but not necessarily wholly what is specified (and includes what is specified; e.g., substantially 90 degrees includes 90 degrees and substantially parallel includes parallel), as understood by a person of ordinary skill in the art. The extent to which the description may vary will depend on how great a change can be instituted and still have a person of ordinary skill in the art recognized the modified feature as still having the required characteristics and capabilities of the unmodified feature. In general, but subject to the preceding, a numerical value herein that is modified by a word of approximation such as "substantially," "approximately," and "about" may vary from the stated value, for example, by 0.1, 0.5, 1, 2, 3, 4, 5, 10, or 15 percent.

The section headings used herein are for organizational purposes and are not to be construed as limiting the subject matter described. If any documents, or portions of documents, are cited in this application, including, but not limited to, patents, patent applications, articles, books, and treatises, such documents are hereby expressly incorporated herein by reference in their entirety for any purpose. In the event that one or more of such incorporated documents etc. and similar materials (if any) defines a term in a manner that contradicts the definition of that term in this application, this application controls.

With general reference to all Figures herein, pressure energized valve seats and seal assemblies (as shown in FIGS. 5, 5A, 5B, 5C, and 5D) are disclosed and described herein with reference to and for use with a gate valve 1 such as shown in FIG. 1. The valve seat 75 and seal assemblies 85 (as shown and discussed with reference below particularly to FIGS. 5, 5A, 5B, 5C, and 5D) can be implemented without limitation, for example, in the gate valve 1 such as that shown and generally disclosed in U.S. Pat. No. 9,091,351, the teachings of which are incorporated herein by reference.

Figure 4:
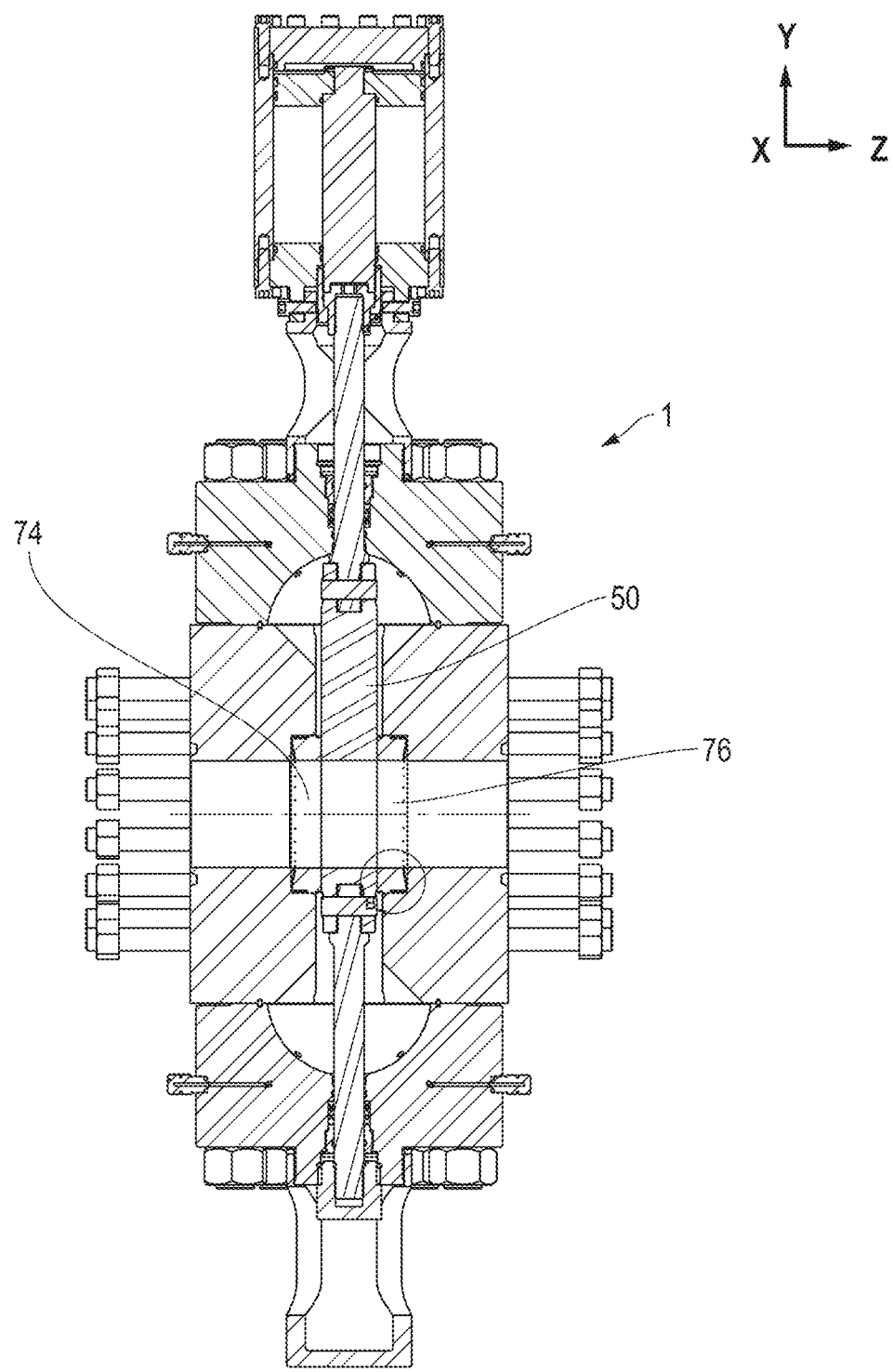
FIG. 4 is a cross sectional view about cutting plane line "A-A" shown in FIG. 2, of a gate valve in an open position and implementing seats and seals according to one or more aspects of the disclosure.
Figure 4A:
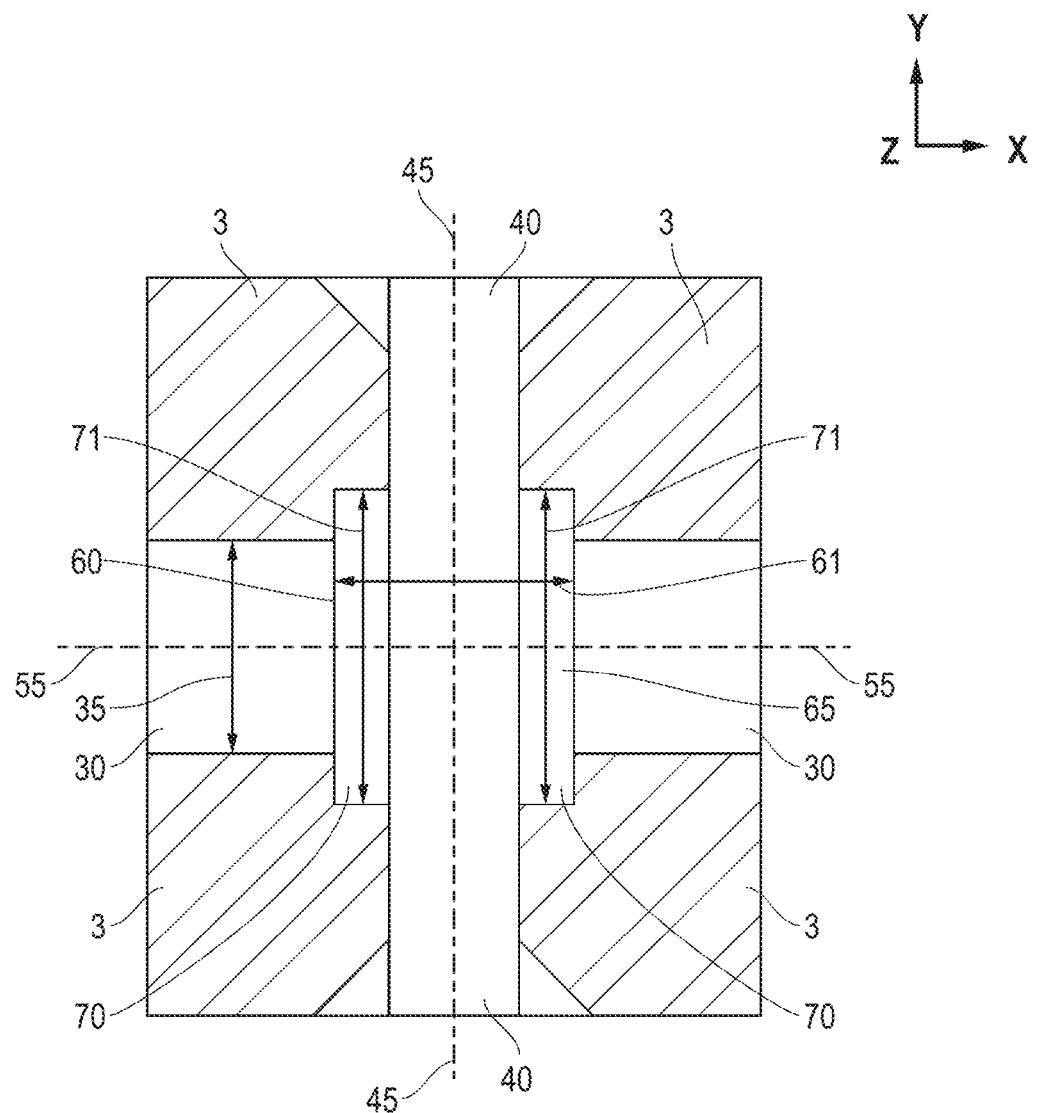
FIG. 4A is schematic view of an exemplary valve body with a gate removed from a gate cavity according to one or more aspects of the disclosure.

Now referring specifically to the Figures, FIG. 1 depicts an exemplary embodiment of a gate valve 1, wherein the gate valve 1 has a valve body 3 having a top valve face 5 and a bottom valve face 10 to attach additional components, as desired, to form the gate valve 1. The gate valve 1 includes a first bonnet 15, which is removably attached to the top valve face 5. The gate valve 1 includes a second bonnet 20, which is attached to the bottom valve face 10. The gate valve 1 also includes an actuator 25 connected to the first bonnet 15. The valve body 3 contains a channel 30 as shown in FIGS. 4A and 6 having a predetermined body bore diameter 35 through which fluid can travel when the gate valve 1 is in an open configuration such that there is no substantial restriction to the flow of fluid through the channel 30.

The valve body 3 contains a gate cavity 40 about a cavity center line 45. The cavity center line 45 passes through the center of the valve body 3 and through the top valve face 5 and the bottom valve face 10. The gate cavity 40 is symmetric about the cavity center line 45 and is disposed perpendicular to the channel 30 thereby permitting a gate 50 to travel within the valve body 3.

Figure 2:
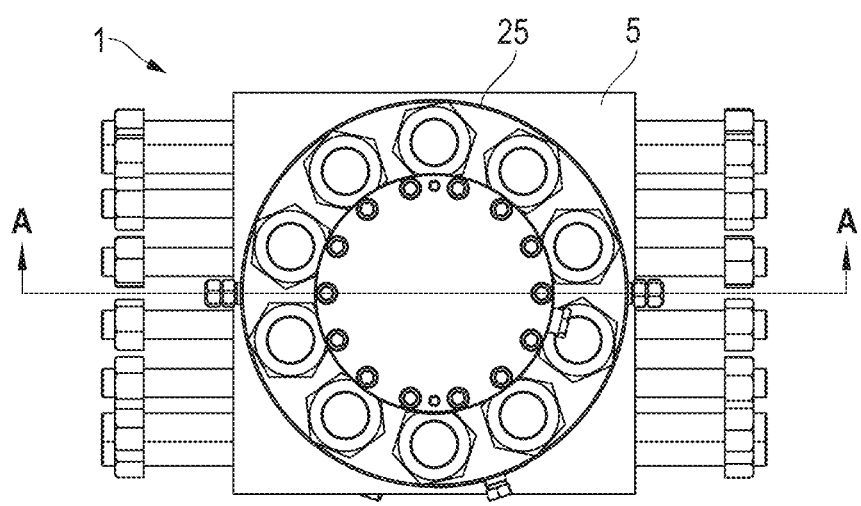
FIG. 2 is a top view of the gate valve in FIG. 1 showing cutting plane line "A-A", according to one or more aspects of the disclosure.
Figure 3:
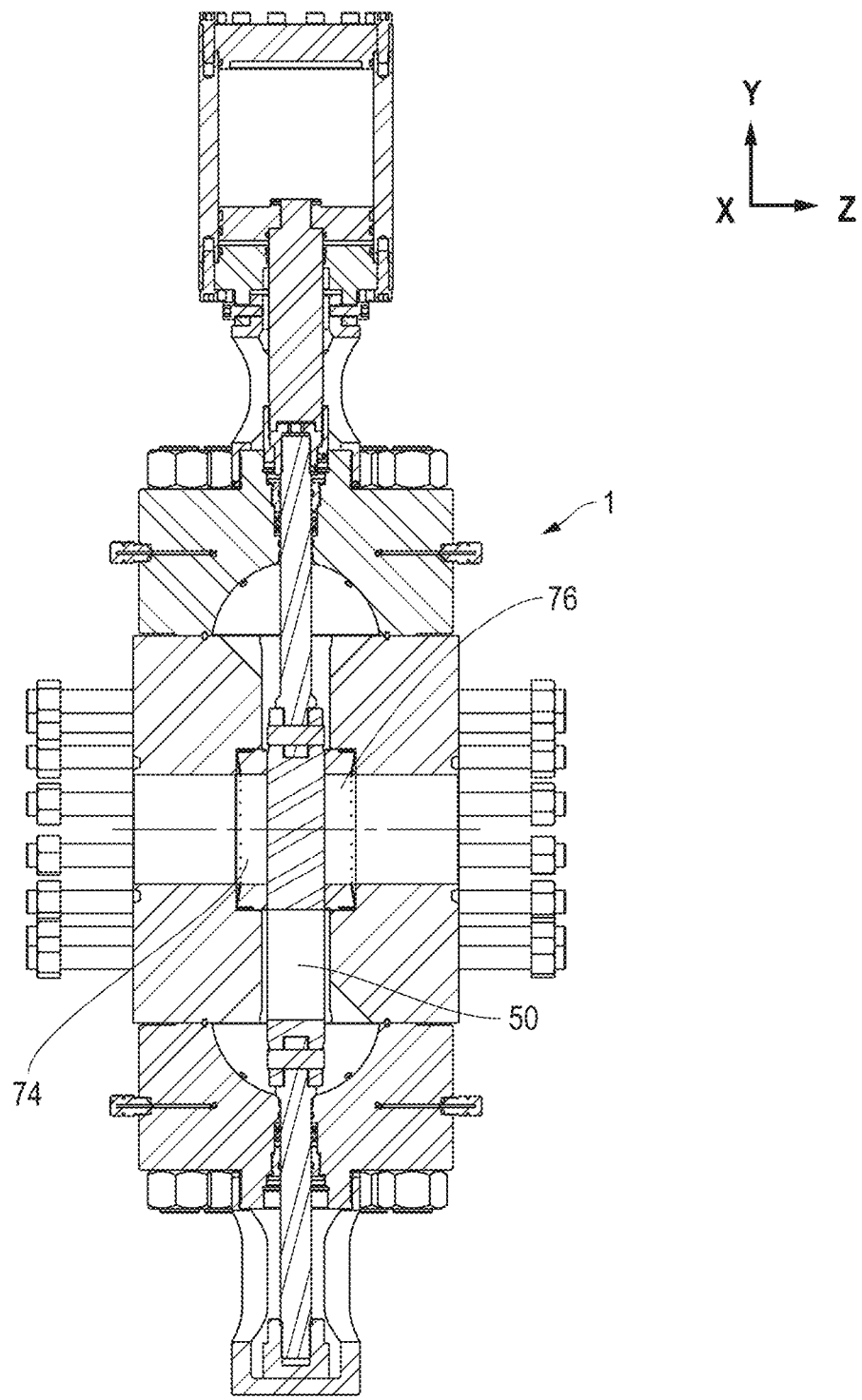
FIG. 3 is a cross sectional view about cutting plane line "A-A" shown in FIG. 2, of a gate valve in a closed position and implementing seats and seals according to one or more aspects of the disclosure.
Figure 5:
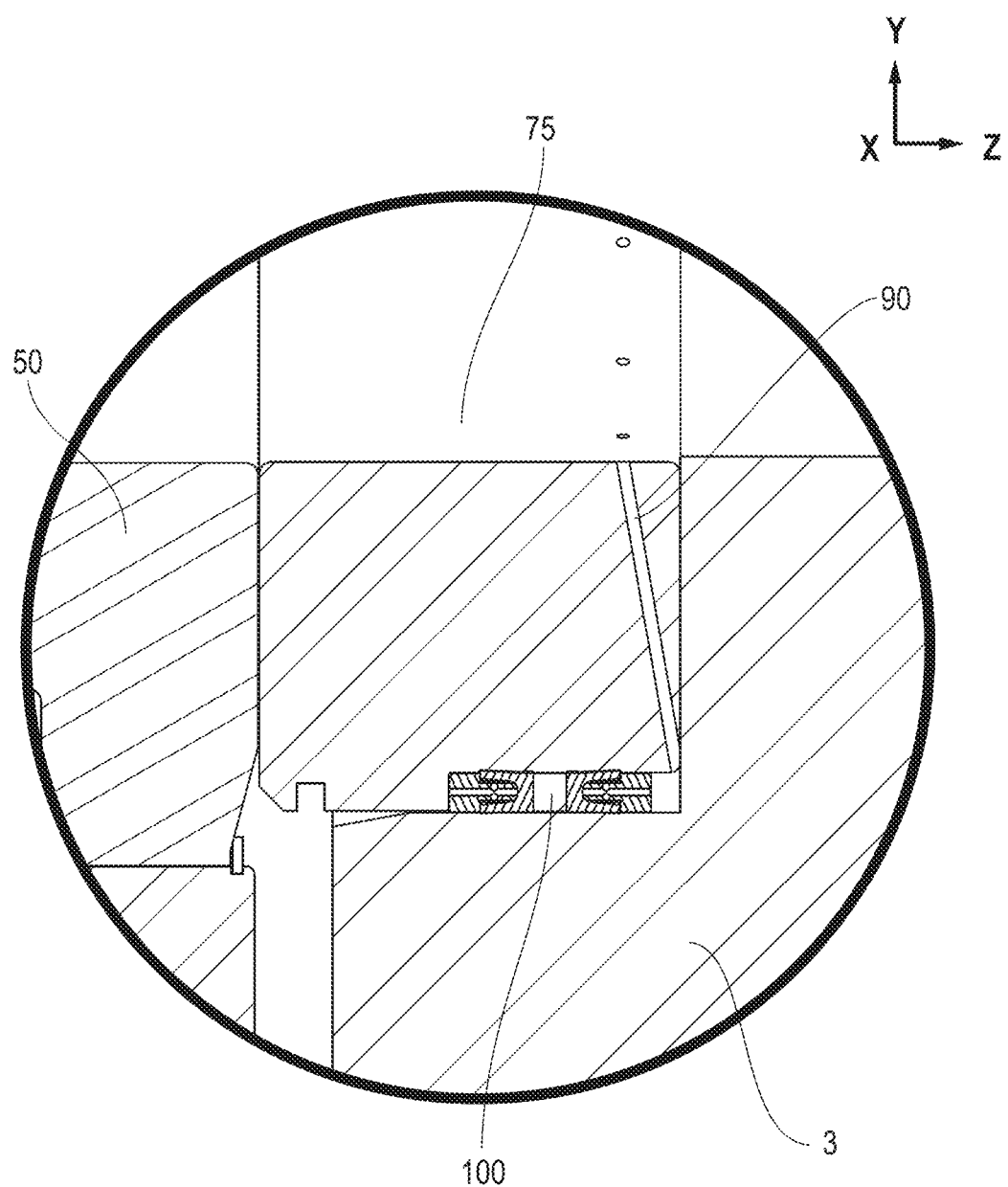
FIG. 5 illustrates an expanded view of Detail "B" from FIG. 4 of a seal assembly positioned in an annular groove of a seat according to one or more aspects of the disclosure.

FIG. 2 depicts a top view of the gate valve 1 and shows cutting plane line "A-A" about which discussion related to FIGS. 3, 4, and 5 will provided below. FIGS. 3 and 4 provide a cross sectional view of the gate valve 1 about section line A-A shown in FIG. 2, wherein FIG. 3 shows the gate valve 1 having a gate 50 disposed in a closed position, whereas FIG. 4 shows the gate valve 1 having a gate 50 disposed in an open position and wherein the disclosure herein of pressurized gate valve seat and seal assemblies are made effective when the gate 50 is in either the open or closed position in the gave valve 1. FIG. 4 denotes a focused detail area labeled as "B" and FIG. 5 provides the cross sectional view of the Detail "B" area shown.

As is noted, FIGS. 3-S each depict three mutually orthogonal directions X, Y, and Z forming a three-dimensional frame of reference XYZ. Such three-dimensional frame of reference can equally be applied throughout all Figures, but such is only shown in relation for discussion to each of FIGS. 1A, and 3-5. According to FIG. 1A, a longitudinal axis X corresponds to the channel center line axis 55 of the channel 30. The Y axis corresponds to the gate cavity center line axis 45 of the gate cavity 40. The X-Z plane is considered to be "horizontal" with reference to the orientation of the gate valve 1 in the Figures. The Y-Z plane is parallel with the gate's 50 sealing faces, the seat 75 faces, and the proximal valve body face 60 and the distal valve body face 65.

With reference to FIGS. 4A, 5, 5A, 5B, 5C, and 5D, the valve body 3 comprises a seat pocket 70 disposed in the channel 30 adjacent to the gate cavity 40. The seat pocket 70 is cylindrical, having a seat pocket diameter 71 and is symmetric about the channel center line axis 55. A seat 75 is disposed inside the seat pocket 70. In the exemplary gate valve 1, and as shown in FIGS. 3 and 4, there are provided a seat 75 positioned on each of opposite sides of the valve body 3 about a proximal valve body face 60 and a distal valve body face 65 and comprised of a proximal seat 74 and a distal seat 76 (each shown in FIGS. 3 and 4), wherein the proximal seat 74 and distal seat 76 are each monolithic in nature.

Figure 5A:
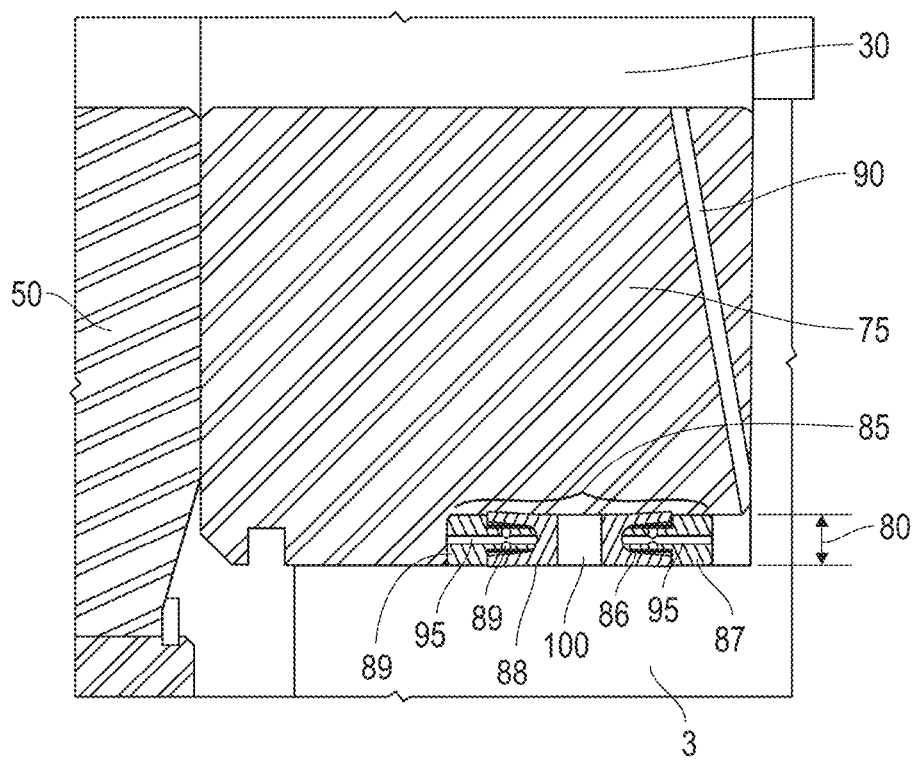
FIG. 5A is an expanded detailed partial cross-sectional view FIG. 5 further depicting the seal assembly positioned in an annular groove of seat and a conduit for providing pressure communication between the valve body channel and the annular groove according to one or more aspects of the disclosure.
Figure 5B:
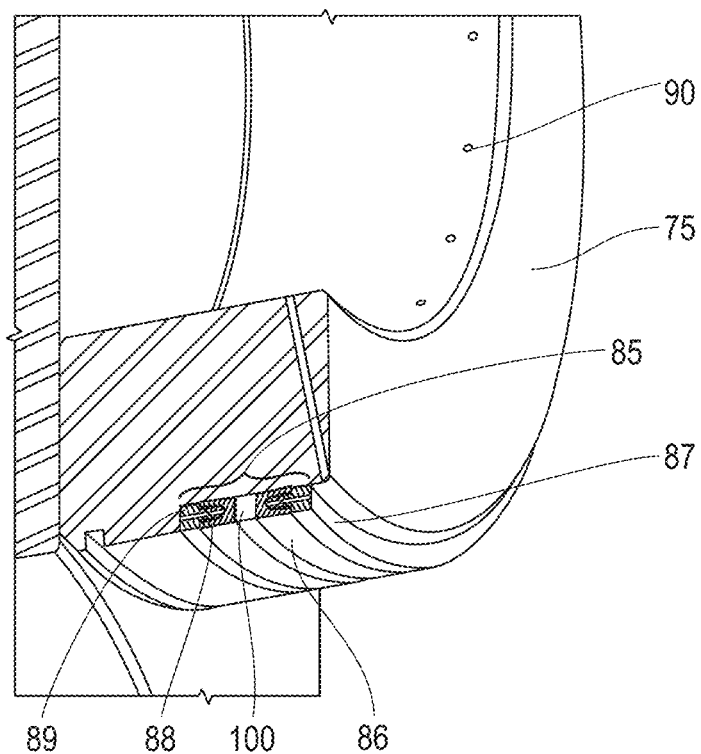
FIG. 5B is another view of the seat and seal assembly as shown in FIGS. 5 and 5A according to one or more aspects of the disclosure.
Figure 5C:
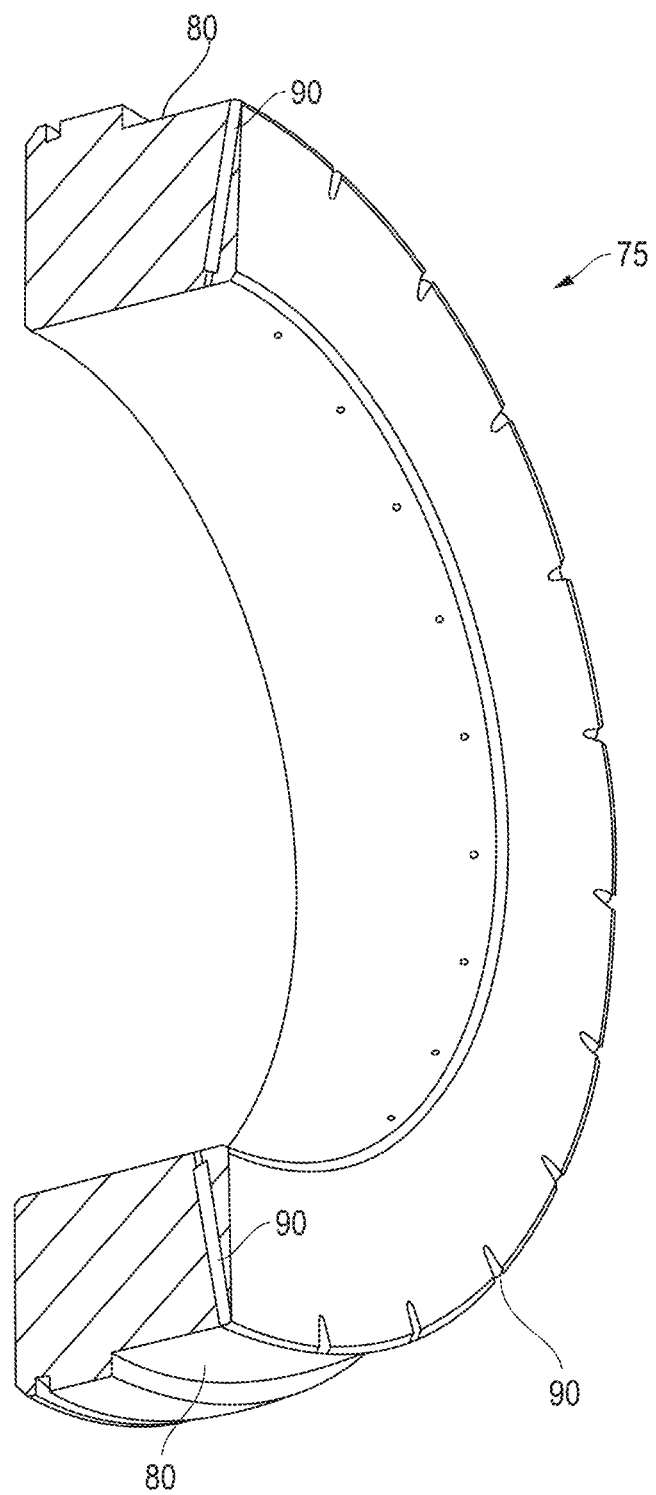
FIG. 5C is a cross sectional view of the seat shown in FIGS. 5, 5A, and 5B, according to one or more aspects of the disclosure.
Figure 5D:
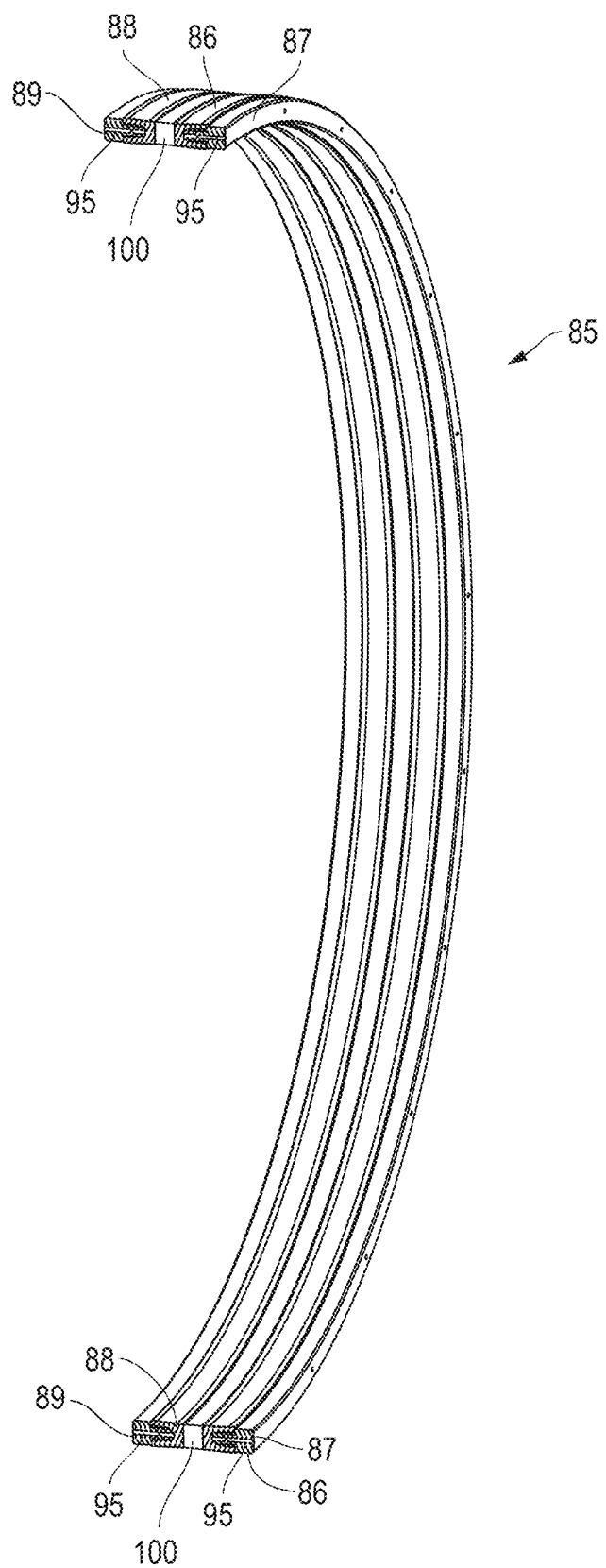
FIG. 5D is a cross sectional view of the seal assembly separated apart from the seat as shown in FIGS. 5, 5A, and 5B according to one or more aspects of the disclosure.

As further shown in FIG. 4A, the valve body 3 has two seat pockets 70 with a diameter having a dimension that is substantially commensurate with the seat 75 outer diameter so that a seat 75 is disposed and engaged within a seat pocket 70. As can be seen in FIGS. 5A and 5C, an annular groove 80 is formed on a portion of the outer surface circumference diameter of each seat 75. A seal assembly 85 as shown in cross sections in FIGS. 5A, 5B, 5C, and 5D is positioned in the annular groove 80. The seal assembly 85 includes a unidirectional axial seal 86 that is activated by pressure to squeeze between the outer surface of the seat 75 and the valve body 3. A plurality of conduits 90, is formed in and through the seat 75 between the channel 30 and the annular groove 80. Each conduit 90 in the plurality of conduits 90 communicates pressure from the channel 30 to the annular groove 80 to energize the seal assembly 85. The plurality of conduits 90 may expedite the process of energizing the seal assembly 85. For example, the plurality of conduits 90 can reduce the time to energize the radial located seal 86 from minutes to seconds.

In exemplary embodiments, the seal assembly 85 in the annular groove 80 is a bi-directional seal assembly 85 having a first unidirectional seal 86 with a first hat ring 87 and a second unidirectional seal 88 with a second hat ring 89, wherein a support seal 100 (e.g., a seal made of polytetrafluoroethylene) is disposed between the seals 86, 88 to provide structural support thereby preventing extrusion. The first hat ring 87 and the second hat ring 89 are cooperative to expand the seals 86, 88 in response to pressure. In some embodiments, a plurality of passages 95 are formed through the hat rings 87, 89 between the annular groove 80 and the unidirectional seals 86, 88. The plurality of passages 95 directly communicate pressure to the unidirectional seals 86, 88.

In an exemplary embodiment, the seats 75 have a maximum ±0.001 inch thickness tolerance, the gate 50 has a maximum ±0.001 inch thickness tolerance, and a seat 75 pocket length from the proximal valve body face 60 to the distal valve body face 65 has a maximum ±0.002 inch thickness tolerance. An exemplary total tolerance stack up of 0.10 inch or less.

The foregoing outlines features of several embodiments so that those skilled in the art may better understand the aspects of the disclosure. Those skilled in the art should appreciate that they may readily use the disclosure as a basis for designing or modifying other processes and structures for carrying out the same purposes and/or achieving the same advantages of the embodiments introduced herein. Those skilled in the art should also realize that such equivalent constructions do not depart from the spirit and scope of the disclosure and that they may make various changes, substitutions, and alterations without departing from the spirit and scope of the disclosure. The scope of the invention should be determined only by the language of the claims that follow. The term "comprising" within the claims is intended to mean "including at least" such that the recited listing of elements in a claim are an open group. The terms "a," "an" and other singular terms are intended to include the plural forms thereof unless specifically excluded.

What is claimed is:
1. A gate valve, comprising:
a valve body having a gate cavity intersecting a channel having a proximal channel portion and a distal channel portion on opposing sides of the gate cavity, wherein a three-dimensional frame of reference comprises three mutually orthogonal directions, wherein an X axis corresponds to a center line of the channel, a Y axis is a center line of the gate cavity, and a Z axis orthogonal to the X axis and the Y axis;

a gate positioned in the gate cavity and moveable between a closed position blocking flow through the channel and an open position allowing flow through the channel, the gate having a proximal gate face and a distal gate face extending perpendicular to the channel; and a proximal seat between a proximal valve body portion and the gate, the proximal seat having a first proximal seat face adjacent a proximal valve body face and a second proximal seat face adjacent the proximal gate face;

a proximal annular groove on a radial outer surface of the proximal seat;

a proximal axial seal positioned in the proximal annular groove in direct contact with the proximal seat and the valve body;

a proximal conduit extending through the proximal seat between the proximal channel portion and the proximal annular groove;

a distal seat between a distal valve body portion and the gate, the distal seat having a first distal seat face adjacent a distal valve body face and a second distal seat face adjacent the distal gate face;

a distal annular groove on a radial outer surface of the distal seat;

a distal axial seal positioned in the distal annular groove in direct contact with the distal seat and the valve body; and a distal conduit extending through the distal seat between the distal channel portion and the distal annular groove.

2. The gate valve of claim 1, wherein the proximal seat is a monolithic seat and the distal seat is a monolithic seat.

3. The gate valve of claim 1, wherein the proximal seat simultaneously contacts the proximal valve body face and the proximal gate face during pressure conditions; and the distal seat simultaneously contacts the distal valve body face and the distal gate face during pressure conditions.

4. The gate valve of claim 1, wherein there is not a seal element positioned between the proximal valve body face and the first proximal seat face; and there is not a seal element positioned between the proximal valve body face and the first proximal seat face.

5. The gate valve of claim 1, wherein the proximal axial seal comprises a first proximal unidirectional seal and the distal axial seal comprises a first distal unidirectional seal.

6. The gate valve of claim 1, wherein the proximal axial seal is a bi-directional seal assembly comprising a first proximal unidirectional seal with a first proximal hat ring and a second proximal unidirectional seal with a second proximal hat ring; and the distal axial seal is a bi-directional seal assembly comprising a first distal unidirectional seal with a first distal hat ring and a second distal unidirectional seal with a second distal hat ring.

7. The gate valve of claim 1, wherein the proximal axial seal is a bi-directional seal assembly comprising a first proximal unidirectional seal with a first proximal hat ring and a second proximal unidirectional seal with a second proximal hat ring;

a first passage through the first proximal hat ring between the proximal annular groove and the first proximal unidirectional seal;

a second passage through the second proximal hat ring between the proximal annular groove and the second proximal unidirectional seal;

the distal axial seal is a bi-directional seal assembly comprising a first distal unidirectional seal with a first distal hat ring and a second distal unidirectional seal with a second distal hat ring;

a first passage through the first distal hat ring between the distal annular groove and the first distal unidirectional seal; and a second passage through the second distal hat ring between the distal annular groove and the second distal unidirectional seal.

8. The gate valve of claim 1, wherein:

the proximal seat and the distal seat have a maximum ±0.001 inch thickness tolerance;

the gate has a maximum ±0.001 inch thickness tolerance; and a seat pocket length from the proximal valve body face to the distal valve body face has a maximum ±0.002 inch thickness tolerance.

\* \* \* \* \*